US012282474B1

(12) United States Patent
Harrington

(10) Patent No.: US 12,282,474 B1
(45) Date of Patent: Apr. 22, 2025

(54) BLOCKCHAIN-BASED SYSTEM FOR STORING HANDLE DATA OF ONLINE PLATFORMS

(71) Applicant: T-Mobile USA, Inc., Bellevue, WA (US)

(72) Inventor: Richard Harrington, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 815 days.

(21) Appl. No.: 17/349,690

(22) Filed: Jun. 16, 2021

(51) Int. Cl.
| | | |
|---|---|---|
| *G06F 17/00* | (2019.01) | |
| *G06F 16/22* | (2019.01) | |
| *G06F 16/23* | (2019.01) | |
| *G06F 16/245* | (2019.01) | |
| *G06F 16/27* | (2019.01) | |
| *G06F 16/955* | (2019.01) | |
| *G06Q 50/00* | (2012.01) | |
| *H04W 4/21* | (2018.01) | |
| *H04W 8/18* | (2009.01) | |

(52) U.S. Cl.
CPC ...... *G06F 16/2379* (2019.01); *G06F 16/2228* (2019.01); *G06F 16/245* (2019.01); *G06F 16/27* (2019.01); *G06F 16/9558* (2019.01); *G06Q 50/01* (2013.01); *H04W 4/21* (2018.02); *H04W 8/18* (2013.01); *G06Q 2220/00* (2013.01)

(58) Field of Classification Search
CPC ............ G06F 16/2379; G06F 16/2228; G06F 16/245; G06F 16/27; G06F 16/9558; G06Q 50/01; G06Q 2220/00; H04W 4/21; H04W 8/18
See application file for complete search history.

(56) References Cited

U.S. PATENT DOCUMENTS

| | | |
|---|---|---|
| 6,493,703 B1 | 12/2002 | Knight et al. |
| 7,685,204 B2 | 3/2010 | Rogers |
| 7,792,789 B2 | 9/2010 | Prahlad et al. |
| 7,904,511 B2 | 3/2011 | Ryan et al. |
| 8,117,281 B2 | 2/2012 | Robinson et al. |
| 8,176,028 B2 | 5/2012 | Rodriguez |
| 9,614,807 B2 | 4/2017 | Spivack et al. |
| 9,871,758 B2 | 1/2018 | Bastide et al. |
| 9,898,519 B2 | 2/2018 | Peri et al. |
| 9,942,189 B2 | 4/2018 | Green et al. |
| 9,961,115 B2 | 5/2018 | Dalton et al. |
| 10,235,509 B2 | 3/2019 | Goldstein |

(Continued)

FOREIGN PATENT DOCUMENTS

| | | |
|---|---|---|
| WO | 2010134127 A1 | 11/2010 |
| WO | 2015025189 A1 | 2/2015 |

*Primary Examiner* — Greta L Robinson
(74) *Attorney, Agent, or Firm* — Perkins Coie LLP

(57) ABSTRACT

A system collects handles of entities registered to post content on online platforms and stores the handles on a blockchain network. The stored handles can mitigate the effects of being deplatformed from the online platforms. In one example, the system registers global identifiers that each uniquely identify an entity. The system receives and indexes handles of various online platforms based on the global identifiers. The indexed handles that are stored on the blockchain network can be searched by followers of a deplatformed entity for an alternative online platform on which the deplatformed entity posts content.

20 Claims, 6 Drawing Sheets

(56) References Cited

U.S. PATENT DOCUMENTS

| | | | |
|---|---|---|---|
| 11,455,694 B2* | 9/2022 | DiNunzio | G06Q 50/01 |
| 2007/0218900 A1 | 9/2007 | Abhyanker | |
| 2008/0103907 A1 | 5/2008 | Maislos et al. | |
| 2008/0262901 A1 | 10/2008 | Banga et al. | |
| 2010/0274815 A1 | 10/2010 | Vanasco | |
| 2010/0306773 A1 | 12/2010 | Lee et al. | |
| 2011/0153423 A1 | 6/2011 | Elvekrog et al. | |
| 2011/0191417 A1 | 8/2011 | Rathod | |
| 2011/0307380 A1 | 12/2011 | Ido | |
| 2012/0109830 A1 | 5/2012 | Vogel | |
| 2012/0110429 A1 | 5/2012 | Tzonis et al. | |
| 2012/0197967 A1 | 8/2012 | Sivavakeesar | |
| 2012/0296974 A1 | 11/2012 | Tabe | |
| 2013/0103735 A1 | 4/2013 | Dowling | |
| 2013/0268357 A1 | 10/2013 | Heath | |
| 2017/0126592 A1 | 5/2017 | El Ghoul | |
| 2019/0327090 A1* | 10/2019 | Innes | H04L 9/3239 |
| 2020/0133955 A1* | 4/2020 | Padmanabhan | G06Q 30/01 |
| 2020/0234339 A1 | 7/2020 | Mcgrath et al. | |

* cited by examiner

BLOCKCHAIN-BASED SYSTEM FOR STORING HANDLE DATA OF ONLINE PLATFORMS

BACKGROUND

Social media are interactive technologies that allow the creation, sharing, and/or exchange of information, ideas, career interests, and other forms of expression via virtual communities and networks. Social media services have some common features including, for example, Internet-based applications, user-generated content (e.g., text posts or comments, digital photos or videos, and data generated through all online interactions), user profiles for associated websites or applications ("apps") that are designed and maintained by the social-media organization, and online social networks that connect a user's profile with those of other individuals or groups.

Users can access social media services via web-based apps on desktops and laptops or download services that offer social media functionality to their mobile devices (e.g., smartphones, tablets). A social media service issues unique "handles" for users to access the service via another of these devices or network portals. A "handle" is another word for a username. It can refer to the name that a user uses in chat rooms, web forums, and social media services like Twitter®. For example, a social media handle is a username used on social media network that begins with the "@" symbol. The handle for a user is unique for one service but usually not unique among different services. Thus, a user commonly has multiple handles for different services.

Deplatforming is the action or practice of preventing someone holding views regarded as unacceptable or offensive from contributing to a forum or debate, especially by blocking them on a website (e.g., social media platforms). The social media platforms that host users can disable handles of certain users or re-assign their handles to other users as a way to block those users from posting content. Thus, the social media platforms have complete control to arbitrarily strip users of their handles, even when users have established an online presence that relies on their unique handles.

BRIEF DESCRIPTION OF THE DRAWINGS

Detailed descriptions of implementations of the present invention will be described and explained through the use of the accompanying drawings.

Figure 1:
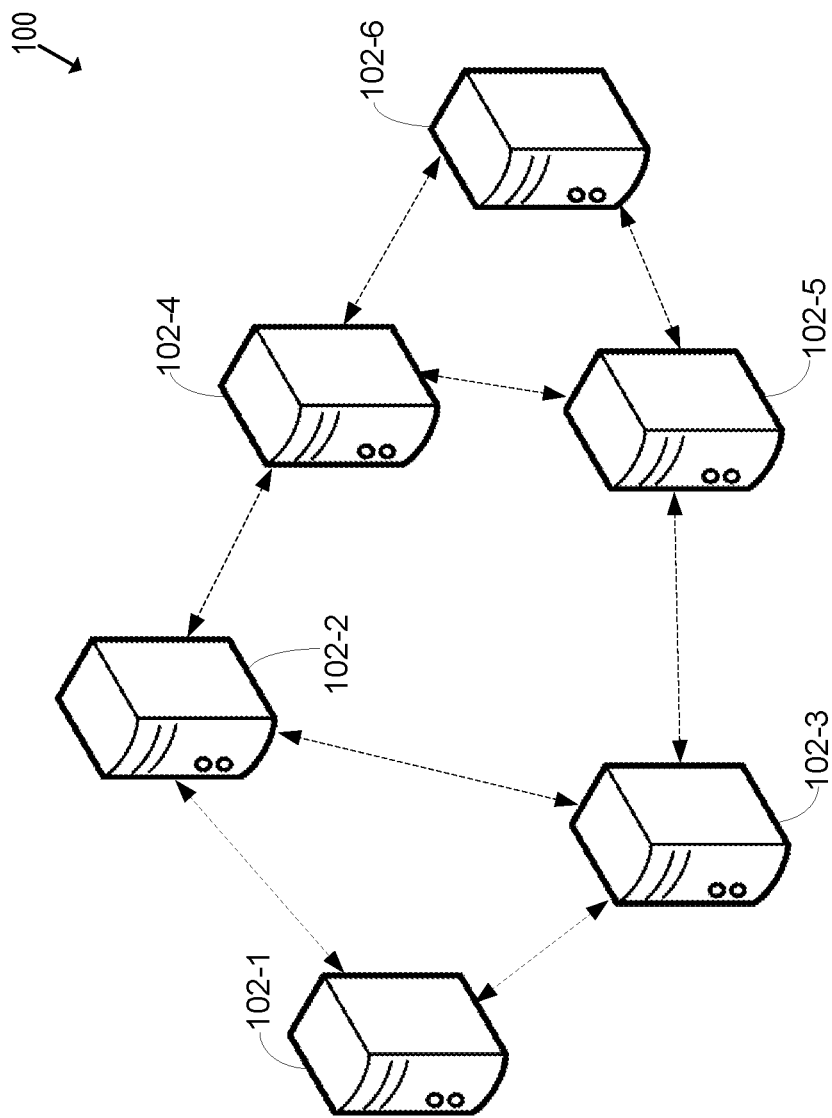
FIG. 1 is a block diagram that illustrates peer nodes of a blockchain network.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In today's modern world, where a virtual online presence is potentially more valuable to a person compared to her real-world presence, the ability to remain connected in online networks is increasingly important. However, a user's virtual presence is vulnerable to being "canceled" by a host platform that can decide to deplatform the user for violating a policy or for any arbitrary reason. Doing so censors the user and destroys a valuable asset. Specifically, users create unique handles to associate a virtual online presence with the real person. For example, the user can create a handle based on the user's name. The user can build an extensive and valuable online presence around the unique handle. Over time, the user develops a following of other users and posts vast content that is associated with the user's handle. As such, followers associate the handle to identify and distinguish the user's content from other users.

The users of a host platform must trust that third-party hosts will not deplatform them by removing access to their handles. The third-parties can decide to lock or cancel an account for any number or reasons or no reason at all. Thus, a social media service provider has total control to grant the user a chosen handle and likewise can strip the user of the handle if, for example, the host determines that the user has posted content that is contrary to a policy. As a result, the user loses a valuable online presence and contact with a network of other users (e.g., followers). A banned user resorts to starting over using a different handle or platform to rebuild a virtual presence. In the meantime, the followers lose connection with the banned user and may never regain the connection. Thus, the handles are controlled by third-parties who have the ability to close accounts, lock a user out of the accounts, and even re-issue those handles to other users, thereby destroying the user's virtual presence.

The disclosed technology mitigates the effects of deplatforming. In one example, a system hosts a service that stores handles and associated data on a blockchain network. The handles uniquely identify users of various online platforms (e.g., social media platforms). The blockchain network is decentralized and stores records that are permanent and immutable. Thus, even if the service stops working, the records will still exist in the distributed blockchain network, and thus impossible for third-party hosts to "cancel" the user or the user's posts. The content of the records can include, in addition to handle data, other user information that serves as "proof of possession" of the handles by users. The user information can include timestamps that verify when the users controlled the handles.

The system can also include content aggregator and search tools. The content aggregator can scan platforms for content posted by users registered with the system. Like the handles, the content can be indexed in association with a registry. The system can call Applicant Programming Interfaces (APIs) to collect content posted on platforms. The search tool is user-centric to search for handles and associated platforms (and/or posted content). For example, the system can administer a network portal that presents a textbox to receive criteria such as a person's name or handle data. The search tool queries the blockchain for data that satisfies the search criteria. For example, a user can query the name of a famous person, and search results can include all the handles and platforms connected with the famous person, as well as timestamps indicating proof of possession and/or posted content.

As such, the system can maintain a directory of multiple handles for different platforms associated with respective users. The system is operated independent of the online platforms with data that is secured in the blockchain network. Therefore, the system can mitigate the effects of deplatforming by providing a permanent and immutable directory where, for example, a user that is banned from one platform can use the service to redirect followers to another platform that is actively being used by the banned user.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Blockchain Network

A blockchain network refers to a record of transactions that are maintained across computers that are linked in a peer-to-peer network. In one example, a blockchain includes a digital distributed ledger that stores digital records of things such as transactions that are distributed and maintained among nodes of a computer network, where the entries are stored in blocks of the ledger that are cryptographically related. A public blockchain is a common example of a distributed ledger that can record transactions between parties in a verifiable and permanent way. Thus, a blockchain network has a decentralized, distributed database where a ledger is maintained by peer nodes. Hence, an intermediary is not required to maintain a blockchain. The transactions are typically authenticated with cryptographic hashing and mining techniques.

A blockchain is analogous to a distributed database on a distributed computing network that maintains a continuously growing list of ordered records called blocks. A block of a blockchain includes records of transaction(s) or other recorded data (e.g., handle data). Each block contains at least one timestamp, and a block links to a previous block to thus form a chain of blocks. Blockchains are inherently resistant to modification of their recorded data. That is, once recorded, the data in a block cannot be altered retroactively. Through a peer network and distributed timestamping, a blockchain is managed in an autonomous manner.

Decentralized consensus can be achieved with a blockchain. This makes blockchains suitable for recording events, condition records, other records management activities, identity management, transaction processing, and proving data provenance. Well-known examples of decentralized networks that implement blockchains include the Bitcoin cryptoasset and cryptocurrencies such as Ethereum and Ripple. These types of networks provide a pragmatic solution for arriving at a consensus in the face of trust and timing problems typically encountered in distributed networks.

FIG. 1 illustrates a network 100 of interconnected peer nodes 102-1 through 102-6 (also referred to collectively as peer nodes 102 and individually as peer node 102). The peer nodes 102 can be distributed across various geographic locations including regions all over the world. The network 100 can include a combination of private, public, wired, or wireless portions. Data communicated over the network 100 can be encrypted or unencrypted at various locations or portions of the network 100. Each peer node 102 can include combinations of hardware and/or software to process data, perform functions, communicate over the network 100, and the like.

The peer nodes 102 can include computing devices such as servers, desktop or laptop computers, handheld mobile devices (e.g., smartphones, smartwatches), and any other electronic device. Any component of the network 100 can include a processor, memory or storage, a network transceiver, a display, operating system and application software (e.g., for providing a user interface), and the like. Other components, hardware, and/or software included in the network 100 that are well known to persons skilled in the art are not shown or discussed herein for the sake of brevity.

The network 100 can implement a blockchain that allows for the secure management of a shared ledger, where transactions are verified and stored on the network 100 without a governing central authority. Blockchains can be implemented in different configurations, ranging from public, open-source networks, to private blockchains that require explicit permission to read or write transactions. Central to a blockchain are cryptographic hash functions that secure the network 100, in addition to enabling transactions, to protect a blockchain's integrity and anonymity.

The network 100 uses cryptography to securely process data. For example, public-key cryptography uses asymmetric key algorithms, where a key used by one party to perform either encryption or decryption is not the same as the key used by another in the counterpart operation. Each party has a pair of cryptographic keys: a public encryption key and a private decryption key. For example, a key pair used for digital signatures consists of a private signing key and a public verification key. The public key can be widely distributed, while the private key is known only to its proprietor. The keys are related mathematically, but the parameters are chosen so that calculating the private key from the public key is unfeasible. The keys could be expressed in various formats, including hexadecimal format.

System Overview

Figure 2:
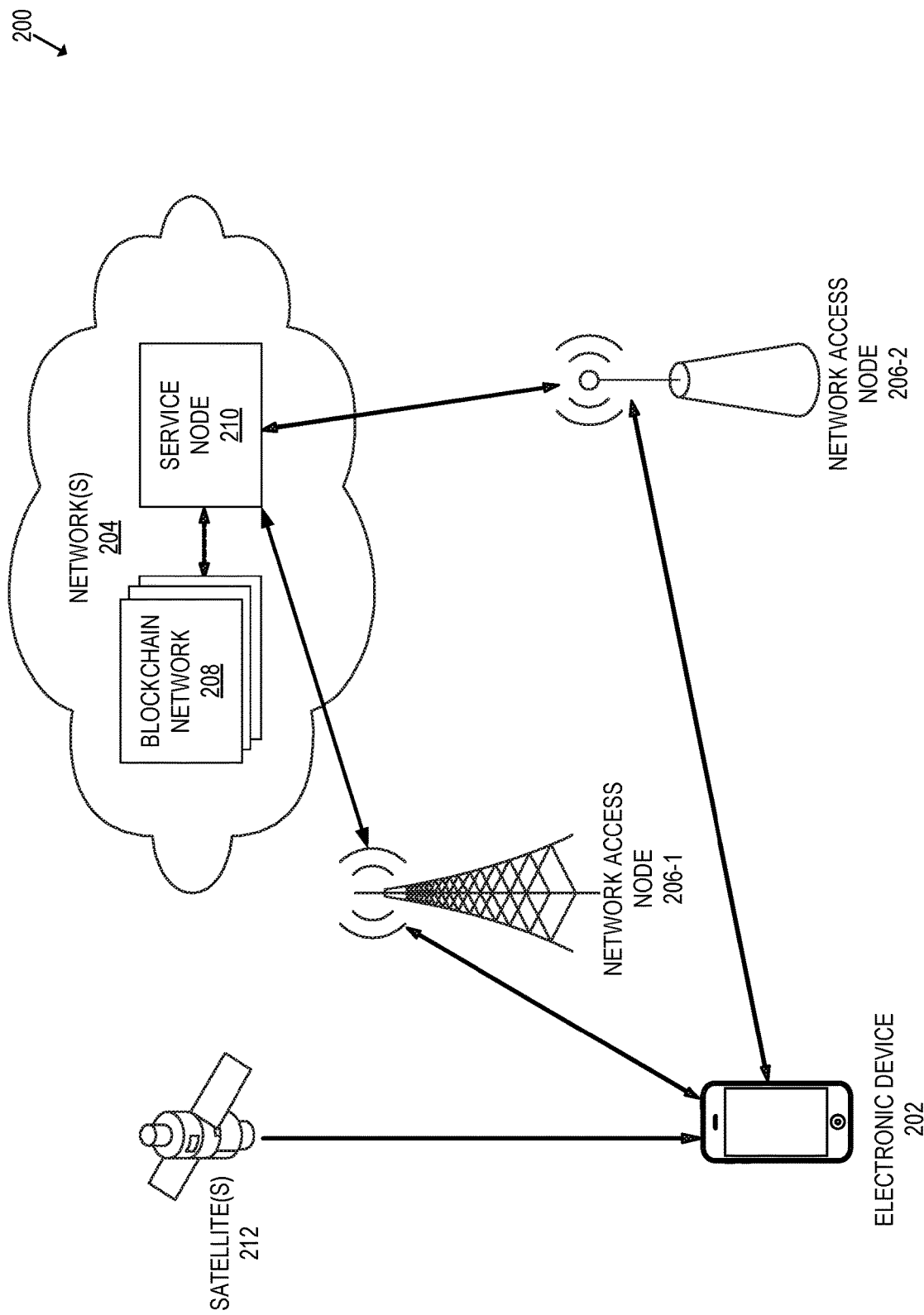
FIG. 2 is a block diagram that illustrates a system configured to store and retrieve handle data maintained on a blockchain network.

FIG. 2 is a block diagram that illustrates a system configured to store and retrieve handle data maintained on a blockchain network. The system 200 includes an electronic device 202 that is communicatively coupled to one or more networks 204 via network access nodes 206-1 and 206-2 (referred to collectively as network access nodes 206).

The electronic device 202 is any type of electronic device that can communicate wirelessly with a network node and/or with another electronic device in a cellular, computer, and/or wireless telecommunications communications system. Examples of the electronic device 202 includes smartphones, tablet computers, wireless devices capable of machine-to-machine (M2M) communication, wearable electronic devices, Internet of Things devices (IoT devices), and any other handheld device that is capable of accessing the network(s) 204. Although only one electronic device 202 is illustrated in FIG. 2, the disclosed embodiments can include any number of electronic devices.

The electronic device 202 can store and transmit (e.g., internally and/or with other electronic devices over a network) code (composed of software instructions) and data using machine-readable media, such as non-transitory machine-readable media (e.g., machine-readable storage media such as magnetic disks, optical disks, read-only memory (ROM), flash memory devices, and phase change memory) and transitory machine-readable transmission media (e.g., electrical, optical, acoustical, or other forms of propagated signals, such as carrier waves or infrared signals).

The electronic device 202 can include hardware such as one or more processors coupled to sensors and a non-transitory machine-readable media to store code and/or sensor data, user input/output (I/O) devices (e.g., a keyboard, a touchscreen, and/or a display), and network connections (e.g., an antenna) to transmit code and/or data using propagating signals. The coupling of the processor(s) and other components is typically through one or more busses and bridges (also referred to as bus controllers). Thus, a non-transitory machine-readable medium of a given electronic device typically stores instructions for execution on a processor(s) of that electronic device. One or more parts of an embodiment of the present disclosure can be implemented using different combinations of software, firmware, and/or hardware.

The network access nodes 206 can be any type of radio network node that can communicate with a wireless device (e.g., electronic device 202) and/or with another network node. The network access nodes 206 can be a network device or apparatus. Examples of network access nodes include a base station (e.g., network access node 206-1), an access point (e.g., network access node 206-2), or any other type of network node such as a network controller, radio network controller (RNC), base station controller (BSC), a relay, transmission points, and the like.

The system 200 depicts different types of wireless access nodes 206 to illustrate that the electronic device 202 can access different types of networks through different types of network access nodes. For example, a base station (e.g., the network access node 206-1) can provide access to a cellular telecommunications system of the network(s) 204. An access point (e.g., the network access node 206-2) is a transceiver that provides access to a computer system of the network(s) 204.

The network(s) 204 can include any combination of private, public, wired, or wireless systems such as a cellular network, a computer network, the Internet, and the like. Any data communicated over the network(s) 204 can be encrypted or unencrypted at various locations or along different portions of the networks. Examples of wireless systems include Wideband Code Division Multiple Access (WCDMA), High Speed Packet Access (HSPA), Wi-Fi, Wireless Local Area Network (WLAN), and Global System for Mobile Communications (GSM), GSM Enhanced Data Rates for Global Evolution (EDGE) Radio Access Network (GERAN), 4G or 5G wireless wide area networks (WWAN), and other systems that can also benefit from exploiting the disclosed technology.

The system 200 includes a blockchain network 208 (e.g., distributed ledger) that stores handles and other user information that is collectively referred to herein as "handle data." Examples of the user information include data that identifies the user, platforms associated with handles, content, and any other data that the user chooses to populate a profile or entry of a user registry (e.g., a directory). In one example, a service node 210 administers a service configured to aggregate handle data, index the handle data, and store the indexed handle data on the blockchain network 208.

In one example, a mobile application ("app") running on the electronic device 202 is administered by the service node 210. A user of the electronic device 202 can enable the app to collect handle data as the user accesses various platform apps running on the electronic device 202. In one example process, the user creates an account for the service, which generates a unique identifier for the user. The service maintains the unique identifier and associated data in the blockchain network 208, which is decentralized and not under control of any third-party platform host.

An example of a unique identifier is a telephone number of the electronic device 202. In another example, the unique identifier is created by the user as a unique handle for the service. The unique identifier is stored in a registry or directory of registered users. The service node 210 can run a subscription service that scans the electronic device 202 for handle data related to new or known online platform apps. The service node 210 can receive the handle data from the electronic device 202 and store the handle data on the blockchain network 208.

The blockchain network 208 is distributed over a combination of network nodes (e.g., peer nodes 102) that store handle data across other network nodes of a peer-to-peer network. The network nodes of the blockchain network 208 can each replicate and store an identical copy of the handle data and update independently. Although shown in the network(s) 204 separate from the service node 210, the blockchain network 208 can be located anywhere including as components of the service node 210.

The service node 210 can mediate the flow of handle data from the electronic device 202 to the blockchain network 208. In some examples, the service node 210 can include any number of server computers communicatively coupled to the electronic device 202 via the network access nodes 206. The service node 210 can include combinations of hardware and/or software to process handle data, perform functions, communicate over the network(s) 204, etc. For example, server computers of the service node 210 can include a processor, memory or storage, a transceiver, a display, operating system and application software, and the like. Other components, hardware, and/or software included in the system 200 that are well known to persons skilled in the art are not shown or discussed herein for brevity. Moreover, although shown as being included in the network(s) 204, the service node 210 can be located anywhere in the system 200 to implement the disclosed technology.

The service node 210 can store the handle data obtained from the electronic device 202 on the blockchain network 208. Specifically, the service node 210 can control parameters that are monitored by the electronic device 202 and select handle data to report to the service node 210. In some examples, the service node 210 can cause components of the electronic device 202 to provide data indicative of contextual information for handle data. For example, the handle data can include timestamps and values that depend on the estimated geographic location of the electronic device 202. The electronic device 202 can obtain timestamps and estimate its location based on global positioning system (GPS) signals received from the satellites 212. The service node 210 can also verify handle data and administer tools such as a search tool to search for handle data stored on the blockchain network 208.

Thus, the system 200 centralizes handle data in a tamperproof and immutable network. Hence, instead of users going to different social media sites, the service node 210 can retrieve all handle data (e.g., all posts/records from all the sites), and show that content in a consolidated user interface (UI). The entities can either post to the social media site that works best (e.g., Instagram for pictures) knowing that followers could find a copy of the same posts on the blockchain network 208. In one example, the service node 210 can post the same content on multiple locations for protection against the loss of content at any vulnerable location. In a worst-case scenario, if a user gets banned from all the main social media sites, the user can build the Internet infrastructure independently and include identities for the social media sites to point to a location on the blockchain network 208.

The system 200 can be used to find all public online persona of an entity (e.g., individual user, group of users, or organization). Although embodiments are mainly described herein relative to an individual user, the same embodiments can apply to other types of entities such as a group of users or an organization. The system 200 includes a search tool that is accessible from an electronic device to search for handle data. For example, the app on the electronic device 202 can present a textbox to receive criteria for handle data. The search tool queries the blockchain network 208 for data that satisfies the search criteria. For example, a user can query the name of a famous person, and the search results can include all the handle data associated with the famous person, as well as timestamps indicating proof of possession. As such, people can verify handles in a way that is independent of third-party platform hosts, and registered users can create links between handles that have been cancelled/locked and active sources of content from the banned users.

The disclosed technology can include other functions and tools. For example, an implementation includes a mechanism to unlock or recover a user's account. For example, the handle data can be used to authenticate the user. Moreover, data other than handle data can be stored on the blockchain network 208. In addition, the service could be the basis of a business that transacts using cryptocurrencies (e.g., access to the service is paid in cryptocurrencies). The service can charge users to generate records, which would also work around situations where payment processors block or cancel a social media site.

Figure 3:
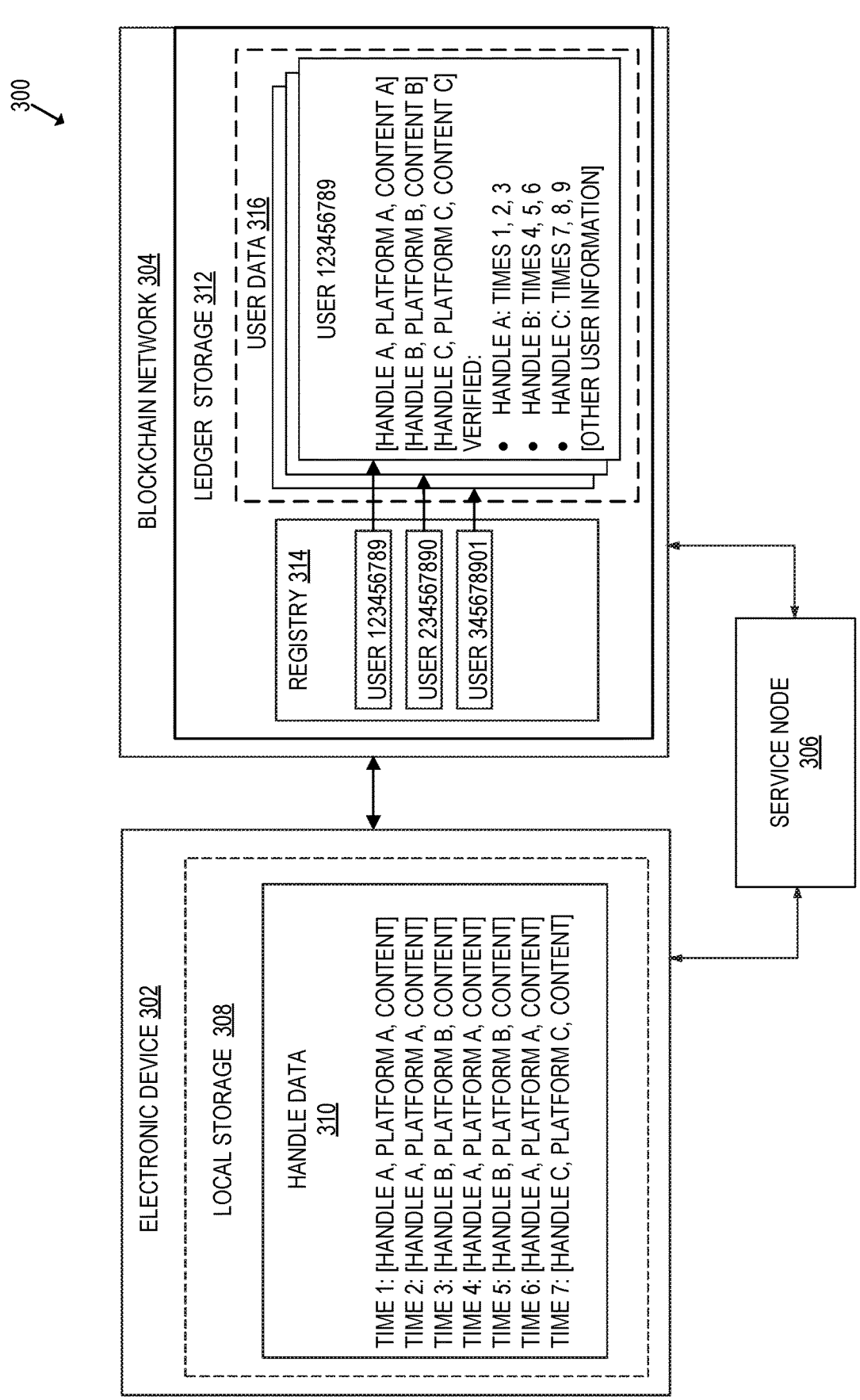
FIG. 3 is a block diagram that illustrates an architecture configured to store and communicate handle data between an electronic device and a blockchain network.

FIG. 3 is a block diagram that illustrates an architecture configured to store and communicate handle data between an electronic device and a blockchain network. An electronic device 302 (e.g., electronic device 202) is communicatively coupled to the blockchain network 304 over a network (e.g., network(s) 204) and via a service node 306 (e.g., service node 210). In some examples, the service node 306 and blockchain network 304 have common network nodes.

The electronic device 202 can include a local storage 308 that can store handle data 310 including handles, indications of online platforms, and content captured at different times. In one example, the local storage 308 includes non-volatile and/or volatile memory that can store the handle data as needed and provide it to the service node 306. In one example, the handle data 310 is monitored by the electronic device 302 and corresponding values are stored as units of handle data including timestamped associations between handles, platforms, and contents for various platforms. In some examples, the handle data can include geographic location values associated with content captured at different points in time.

The electronic device 302 can push handle data out according to a schedule or upon the occurrence of an event. For example, the electronic device 302 can push handle data out to the service node 306 periodically (e.g., weekly). In another example, the electronic device 302 can push handle data to the service node 306 in response to an event such as when the user posts content on a social media platform or upon connection of the electronic device 302 to a network coupled to the service node 306. In one example, the service node 306 can control when to pull handle data from the electronic device (e.g., on schedule, on-demand).

The service node 306 can push handle data to the blockchain network 304, which stores the handle data in a ledger storage 312. The contents of the local storage 308 and the ledger storage 312 can be the same or different. For example, the service node 306 can process handle data obtained from various electronic devices and push the processed handle data for the blockchain network 304.

The ledger storage 312 can store handle data in distinct sections or containers including a registry 314 and user data 316. The registry 314 lists the different users and associated unique identifiers (e.g., telephone numbers) for the service. The user data 316 includes respective records of handle data for each registered user. The handle data can map user handles, platforms, and content, as well as instances when handles were verified. In one example, the handle data can include other user information that is not retrieved from the electronic device 302 but instead provided directly for storage on the blockchain network 304. Examples include a link to a private resource that store content for the user. In another example, the service node 306 can process the handle data through a hashing function to further secure the handle data stored at the blockchain network 304.

The local storage 308 is optional because the electronic device 302 does not need to maintain handle data in non-volatile memory. Instead, the electronic device 302 can instantaneously communicate handle data to the service node 306 in response to the generation of the handle data. In one example, the contents of the local storage 308 can be accessed by the electronic device 302 independent of the storage nodes 306 (e.g., while disconnected from any network). For example, the electronic device 302 can have monitoring functionality that is meant to alert the user to add a newly discovered handle to the user data 316. The same data collected for the user can be communicated to the ledger storage 312 as a third-party trusted repository of handle data that can be subsequently used to verify a handle.

The ledger storage 312 can include one or more records that store data fields and timestamps for handle data, such as a proof of possession. The ledger storage 312 includes memories of peer nodes of the blockchain network 304. The contents of the ledger storage 312 can be accessible by the service node 306, the electronic device 302, or any third party that seeks to independently search handle data of registered users. Accordingly, the contents of the local storage 308 and/or the ledger storage 312 is the basis for mitigating the effects of deplatforming.

Registering and Retrieving Handle Data

Figure 4:
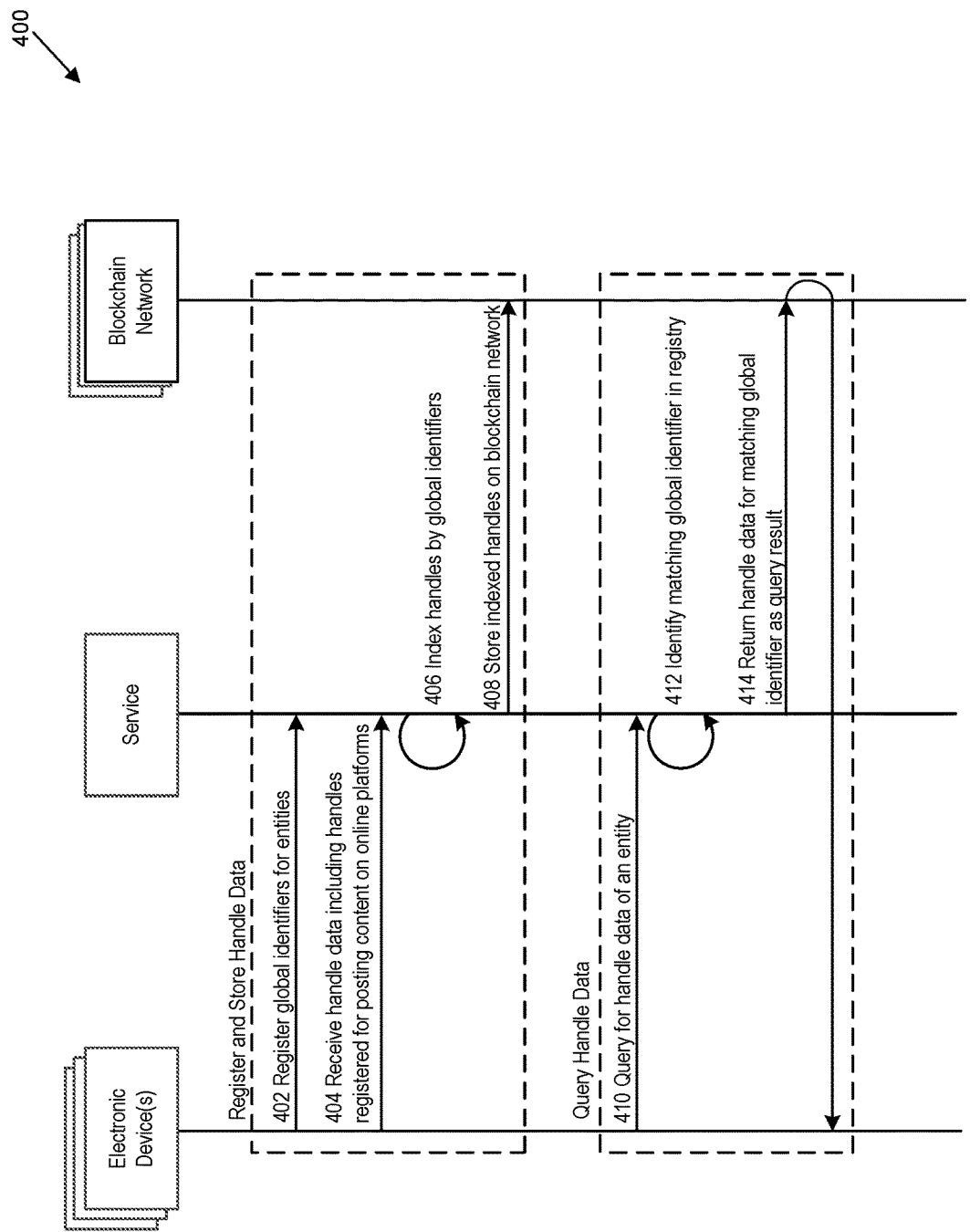
FIG. 4 is a flow diagram that illustrates processes for updating and querying handle data stored in a blockchain network.

FIG. 4 is a flow diagram that illustrates processes for registering and retrieving handle data stored on a blockchain network. The processes 400 include operations performed by a system including or coupled to one or more electronic devices, a blockchain network, and one or more nodes of a service that mediate collection and storage of handle data on the blockchain network. The service can process queries to retrieve handle data stored on the blockchain network. In one example, an electronic device is a smartphone, the network includes a wireless telecommunications network, and the handle data is obtained from a mobile app running on the smartphone.

At 402, the system registers a global identifier in a registry of multiple global identifiers. Each global identifier uniquely identifies an entity in the registry. Examples of an entity include a user, group of users, or an organization. Examples of a global identifier include a telephone number of a user's smartphone or a custom handle created by the user. The registry is administered by the service of the system.

In one example, the system causes a mobile app running on a smartphone to execute a background process that scans for data indicative of any online platform on which a user registered to post content. The mobile app can discover a handle based on the local data and communicate a copy of the handle for the registry, which can index the handle based on a global identifier of the user.

In another example, the mobile app detects that a user is newly registered on a social media platform or that new content is posted in connection with the user on the social media platform. In response, the mobile app can retrieve a handle of the user for the social media platform and forward the handle or content for storage on the blockchain network. In yet another example, a user can manually input handle data into an interface administered by the system.

At 404, the system receives handle data over the wireless network from the electronic device (e.g., smartphone). The handle data includes a handle that uniquely identifies the entity from among multiple entities that registered to post content on an online platform. In one example, the service is a subscription service that is regularly paid for by the entity using cryptocurrency, where the entity is a subscriber of the service. As part of the subscription service, the system can retrieve handle data in response to events detected on a smartphone. For example, an event can include an indication that the entity is newly registered on an online platform or that new content is posted in connection with the entity on any online platform. As such, the system automatically receives handle data from the smartphone for storage on the blockchain network based on detected events.

At 406, the system indexes the handle data based on the global identifier. All of the handle data for the same entity is indexed based on the same global identifier. The handle data uniquely identifies the same entity from among entities that registered to post content on various online platforms. The system can also index content posted in connection with the same entity based on the same global identifier.

At 408, the system stores the handle data for the same entity on the blockchain network, which is indexed by the same global identifier. In one example, the handles are each stored in association with an indication that the entity is either authorized or deauthorized to post content on an online platform based on the handle.

In one example, the system receives an indication that an entity has been or is potentially blocked from posting content on a social media platform. The system can update the registry to indicate that the corresponding handle is potentially disabled and that another handle for another social media platform is active and preferred for the same entity. The system can optionally generate a token that is configured to post as content on the social media platform that is attempting to deplatform the user. The entity can post the token to redirect followers to the other social media platform. The token can include a hyperlink to the other social media platform. In an example, the entity is prompted to post a message such as "Go here for a permanent address: [URL]."

The registered handle data is available from the blockchain network for public inspection. As such, at 410, the system receives a query including content that identifies an entity or a handle of the entity. For example, the mobile app running on the smartphone can include a search tool configured to enable a user to search for handle data of other users stored in the blockchain network. The search function can enable followers to search for handles of a blocked user or an associated service (e.g., link to a private server).

At 412, the system searches the registry for a global identifier including handle data that matches the content of the query. For example, the service can match a handle or any other criteria associated with an entity and identify a global identifier for the same entity. Thus, all the handles for the same entity can be retrieved. In one example, handles are prioritized based on preferences set by the entity or based on posting activity of the entity. For example, a handle for a social media platform on which the entity posts more content relative to the entity's other social media platform is designated as a preferred platform.

At 414, the system retrieves, from the blockchain network, any handles for the same entity based on the entity's global identifier. The system returns the retrieved handles as a result that satisfies the query. In another example, the system receives a query from a follower for a handle of a user that has been banned from a social media platform. In response to the query, the system can provide a preferred handle in connection with a social media platform on which the same entity is allowed to post content.

Validating Handles

Figure 5:
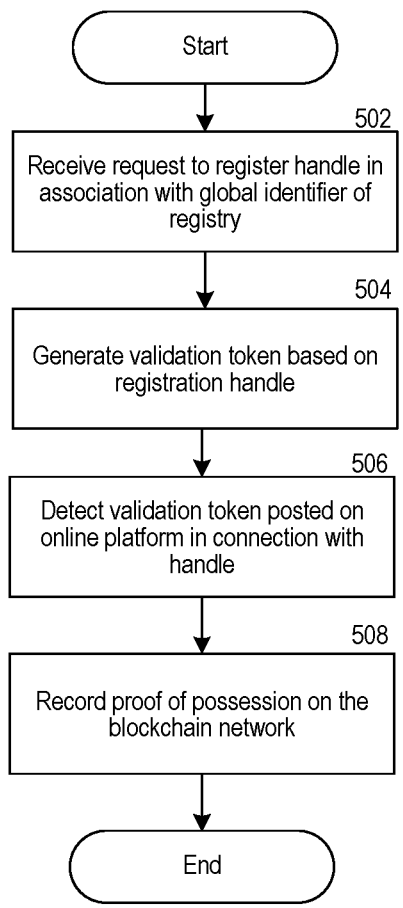
FIG. 5 is a flow diagram that illustrates a process for validating a handle as a "proof of possession" by a user.

FIG. 5 is a flow diagram that illustrates a process for validating "proof of possession" of a handle by a user. The proof of possession indicates a time when a handle was connected with an entity. A validated handle is associated with a timestamp and is stored in the blockchain network. The validation process prevents from misidentifying a handle for an entity after an online platform re-assigns the handle to another entity (e.g., as occurs with handles for public offices). As such, the public can search the blockchain network for handles that are in current possession by an entity.

At 502, the system receives a request to validate a handle connected with an entity. For example, the service can administer a portal that presents a UI on a smartphone. The UI can guide the entity through a series of steps to validate the handle. In one example, a user inputs a handle for an online platform to initiate the validation process.

At 504, the system responds by generating a validation token that associates the handle, online platform, and/or a global identifier. The validation token is configured to post in connection with the entity as content on the online platform. For example, the service can generate a unique identifier such as a URL, string of characters, graphic, etc. The user is prompted to post the validation token as content on the online platform.

At 506, the system detects the validation token as content posted on the online platform in connection with the handle of the entity. The timestamp of the posted content is set as the point in time in which the entity had possession of the handle. In one example, the service searches the platform for the validation token posted as content in connection with the entity. Identification of the posted content including the validation token serves as proof of possession of the handle at the time when the content was posted.

At 508, the system stores, on the blockchain network, at least an indication of a proof of possession of the handle by the entity at the point in time when the validation token was posted as content. Thus, the system validates possession of the handle by the user and creates an immutable record in a public blockchain (e.g., Ethereum network) that permanently links the entity's global identifier to the handle. As a result, clients of the service can search the blockchain network for records to verify that an entity had access to certain handles at certain times.

In a further implementation, the search and validation tools can be used to recover a password associated with a handle. For example, the system can store passwords for respective handles. The system can receive a request to retrieve a first password for a first handle. The request can identify a second handle associated with the same entity of the first handle. The system can generate a validation token based on the second handle. The validation token is configured for posting as content on the second online platform. The system can search and detect the validation token as content posted on the second online platform. In response, the system returns the first password for the first handle because the entity was validated based on the validation token posted on the second online platform.

Computer System

Figure 6:
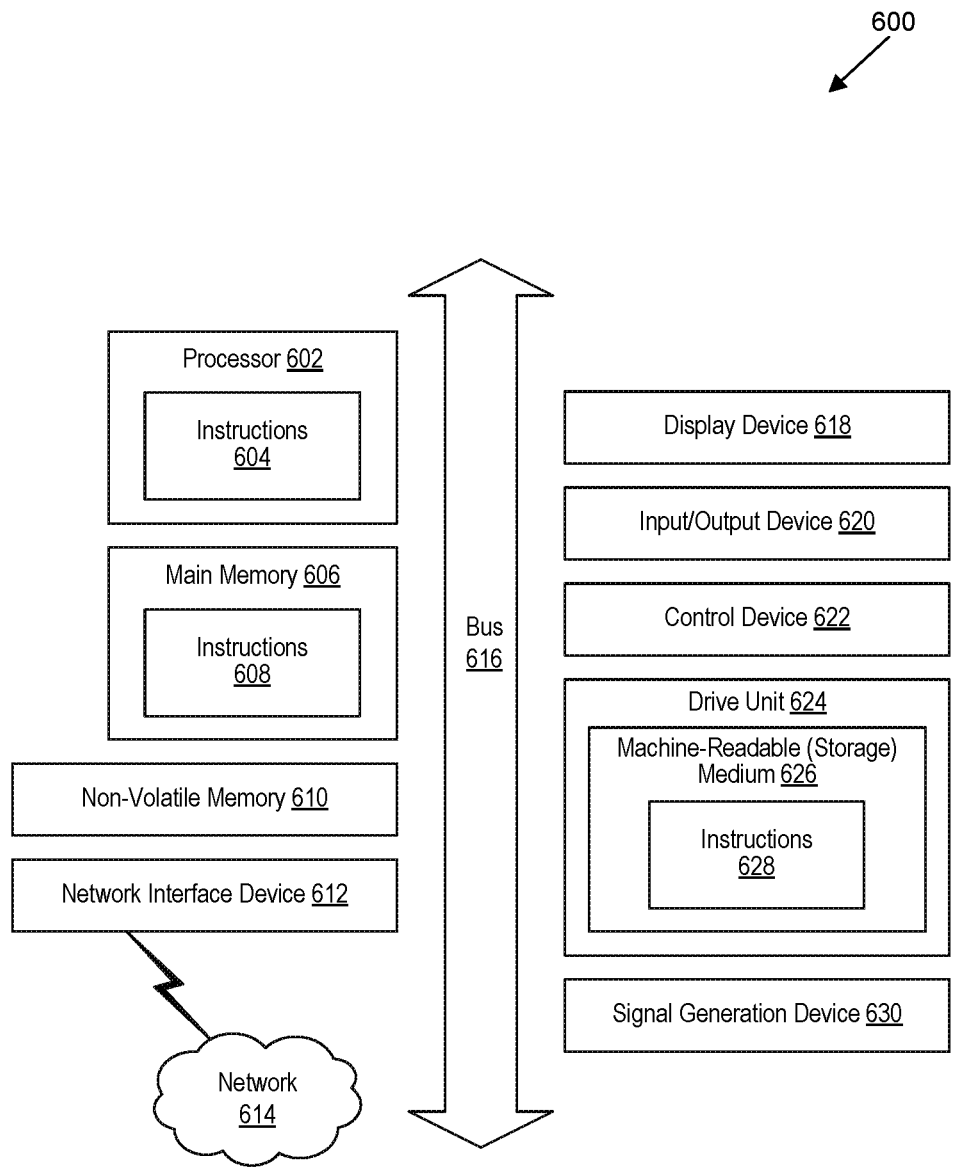
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. At least one computer-readable storage medium, excluding transitory signals and carrying instructions, which, when executed by at least one data processor of a system, cause the system to:
   register a first global identifier in a registry of multiple global identifiers,
      wherein the first global identifier uniquely identifies a first entity from among multiple entities of the registry, and
      wherein the registry is administered by a service of the system that includes or is coupled to a blockchain network;
   receive first handle data over a wireless network from an electronic device,
      wherein the first handle data includes a first handle that uniquely identifies the first entity from among a first set of multiple entities that registered to post content on a first online platform;
   index the first handle data and a second handle data based on the first global identifier,
      wherein the second handle data includes a second handle that uniquely identifies the first entity from among a second set of multiple entities that registered to post content on a second online platform; and
   store the first handle on the blockchain network such that the first handle and the second handle are identifiable based on the first global identifier.

2. The at least one computer-readable storage medium of claim 1 further causing the system to:
   receive a query including content that identifies a second entity;
   search the registry based on the query for a second global identifier including handle data that matches the content of the query;
   retrieve, from the blockchain network, at least one handle for the second global identifier of the second entity; and
   return the retrieved handles as a result that satisfies the query.

3. The at least one computer-readable storage medium of claim 1 further causing the system to:
   receive a query including a third handle of the first entity,
      wherein the third handle uniquely identifies the first entity from among a third set of multiple entities that registered to post content on a third online platform;
   match the third handle in association with the first global identifier; and
   return search results retrieved from the blockchain network that satisfy the query,
      wherein the search results include the first handle or the second handle.

4. The at least one computer-readable storage medium of claim 1, wherein the electronic device is a smartphone, and the entity is a user of the electronic device, the system being further caused to, prior to being caused to receive the first handle data:
   cause a software application running on the smartphone to scan for local data indicative of any online platform that allows the user to post content; and
   discover the first handle based on the local data,
      wherein the first handle data is retrieved by the system from the smartphone over the wireless network.

5. The at least one computer-readable storage medium of claim 1, wherein the system is further caused to, prior to the first handle data being indexed:
receive a request to validate the first handle in connection with the first entity;
in response to the request, generate a validation token that associates at least two of the first handle, the first online platform, and the first global identifier,
wherein the first online platform is a social media platform,
wherein the validation token is configured for posting by the first entity as content on the social media platform,
detect the validation token as content posted at a point in time on the social media platform in connection with the first handle; and
record, at the blockchain network, an indication of a proof of possession of the first handle by the first entity at the point in time.

6. The at least one computer-readable storage medium of claim 1, wherein the system is cause to:
register additional global identifiers that uniquely identify additional entities in the registry,
wherein the additional entities include a user, a group of users, and an organization.

7. The at least one computer-readable storage medium of claim 1, wherein the system is cause to:
receive, from the electronic device, a copy of content posted on the first online platform in association with the first handle; and
store the copy of content on the blockchain network in connection with the first global identifier.

8. The at least one computer-readable storage medium of claim 1, wherein the system is further cause to:
administer an interface on a mobile device configured to receive input indicative of handles registered to post content on online platforms, and
wherein the interface includes a search tool configured to enable a user to search the blockchain network for handle data of other users.

9. The at least one computer-readable storage medium of claim 1, wherein the service is a subscription service and the first entity is a subscriber of the subscription service, the system being further caused to:
retrieve handle data in response to an event detected at the electronic device,
wherein the event includes an indication that the first entity is newly registered on an online platform or that new content is posted in connection with the first entity on the first online platform or the second online platform.

10. The at least one computer-readable storage medium of claim 1, wherein the system stores passwords for respective handles, the system being further caused to:
receive a request to retrieve a first password for the first handle,
wherein the request indicates the second handle,
in response to the request, generate a validation token based on the second handle,
wherein the validation token is configured for posting as content on the second online platform,
detect the validation token as content posted on the second online platform in connection with the second handle; and
in response to detecting the validation token, return the first password for the first handle.

11. The at least one computer-readable storage medium of claim 1, wherein the electronic device is a smartphone, the first entity is a user of the smartphone, and the first global identifier is a telephone number of the smartphone, the system being further caused to:
administer a software application on the smartphone configured to detect that the user is newly registered on a social media platform or that new content is posted in connection with the user on the social media platform,
wherein the system retrieves a handle of the user for the social media platform over the wireless network from the software application.

12. The at least one computer-readable storage medium of claim 1, wherein the first handle and the second handle are stored in association with a respective indication that the first entity is either authorized or deauthorized to post content on the first online platform or the second online platform.

13. A system for use with a wireless telecommunications network and a blockchain network, the system comprising:
at least one hardware processor; and
at least one non-transitory memory storing instructions, which, when executed by the at least one hardware processor, cause the system to:
register a first global identifier in a registry of multiple global identifiers,
wherein the first global identifier uniquely identifies a first entity from among multiple entities of the registry, and
wherein the registry is administered by a service of the system that includes or is coupled to a blockchain network;
receive first handle data over a wireless network from an electronic device,
wherein the first handle data includes a first handle that uniquely identifies the first entity from among a first set of multiple entities that registered to post content on a first online platform;
index the first handle data and a second handle data based on the first global identifier,
wherein the second handle data includes a second handle that uniquely identifies the first entity from among a second set of multiple entities that registered to post content on a second online platform; and
store the first handle on the blockchain network such that the first handle and the second handle are identifiable based on the first global identifier.

14. The system of claim 13, further caused to:
receive a query including content that identifies a second entity;
search the registry based on the query for a second global identifier including handle data that matches the content of the query;
retrieve, from the blockchain network, at least one handle for the second global identifier of the second entity; and
return the retrieved handles as a result that satisfies the query.

15. The system of claim 13, further caused to:
receive a query including a third handle of the first entity,
wherein the third handle uniquely identifies the first entity from among a third set of multiple entities that registered to post content on a third online platform;
match the third handle in association with the first global identifier; and
return search results retrieved from the blockchain network that satisfy the query, wherein the search results include the first handle or the second handle.

16. The system of claim 13, wherein the electronic device is a smartphone, and the entity is a user of the electronic device, the system further caused to, prior to being caused to receive the first handle data:
cause a software application running on the smartphone to scan for local data indicative of any online platform that allows the user to post content; and
discover the first handle based on the local data,
wherein the first handle data is retrieved by the system from the smartphone over the wireless network.

17. A method comprising:
registering a first global identifier in a registry of multiple global identifiers,
wherein the first global identifier uniquely identifies a first entity from among multiple entities of the registry, and
wherein the registry is administered by a service that includes or is coupled to a blockchain network;
receiving first handle data over a wireless network from an electronic device,
wherein the first handle data includes a first handle that uniquely identifies the first entity from among a first set of multiple entities that registered to post content on a first online platform;
indexing the first handle data and a second handle data based on the first global identifier,
wherein the second handle data includes a second handle that uniquely identifies the first entity from among a second set of multiple entities that registered to post content on a second online platform; and
storing the first handle on the blockchain network such that the first handle and the second handle are identifiable based on the first global identifier.

18. The method of claim 17, wherein prior to indexing the first handle data, the method further comprising:
receiving a request to validate the first handle in connection with the first entity;
in response to the request, generating a validation token that associates at least two of the first handle, the first online platform, and the first global identifier,
wherein the first online platform is a social media platform,
wherein the validation token is configured for posting by the first entity as content on the social media platform,
detecting the validation token as content posted at a point in time on the social media platform in connection with the first handle; and
recording, at the blockchain network, an indication of a proof of possession of the first handle by the first entity at the point in time.

19. The method of claim 17, further comprising:
receiving, from the electronic device, a copy of content posted on the first online platform in association with the first handle; and
storing the copy of content on the blockchain network in connection with the first global identifier.

20. The method of claim 17, wherein the service is a subscription service and the first entity is a subscriber of the subscription service, the method further comprising:
retrieving handle data in response to an event detected at the electronic device,
wherein the event includes an indication that the first entity is newly registered on an online platform or that new content is posted in connection with the first entity on the first online platform or the second online platform.

* * * * *